(12) United States Patent
Li

(10) Patent No.: US 9,307,864 B2
(45) Date of Patent: Apr. 12, 2016

(54) GRILL

(71) Applicant: TSANN KUEN (ZHANGZHOU) ENTERPRISE CO., LTD., Zhang Zhou, Fujian (CN)

(72) Inventor: Chunhua Li, Zhang Zhou (CN)

(73) Assignee: TSANN KUEN (ZHANG ZHOU) ENTERPRISE CO., LTD., Zhangzhou (CN)

( * ) Notice: Subject to any disclaimer, the term of this patent is extended or adjusted under 35 U.S.C. 154(b) by 468 days.

(21) Appl. No.: 13/716,722

(22) Filed: Dec. 17, 2012

(65) Prior Publication Data

US 2013/0152802 A1 Jun. 20, 2013

(30) Foreign Application Priority Data

Dec. 15, 2011 (CN) ...................... 2011 2 0528448 U

(51) Int. Cl.
*A47J 37/10* (2006.01)
*A47J 37/06* (2006.01)

(52) U.S. Cl.
CPC .......... *A47J 37/0629* (2013.01); *A47J 37/0611* (2013.01)

(58) Field of Classification Search
CPC .......................... A47J 37/0629; A47J 37/0611
USPC .............. 99/372, 376, 377, 380, 421 R–422, 99/424–450, 349, 341, 351, 391, 389, 331, 99/381; 126/214 R, 299 C, 37 A; 219/524, 219/385, 386, 403, 404, 443.1, 450.1
See application file for complete search history.

(56) References Cited

U.S. PATENT DOCUMENTS

| | | | | | |
|---|---|---|---|---|---|
| 1,977,237 | A | * | 10/1934 | Methe | 99/379 |
| 2,102,879 | A | * | 12/1937 | Benson | 99/376 |
| 2,559,681 | A | * | 7/1951 | Senseman | 292/250 |
| 2,795,182 | A | * | 6/1957 | Gomersall | 99/376 |
| 2,836,171 | A | * | 5/1958 | Cripe | 126/214 R |
| 2,936,697 | A | * | 5/1960 | Kueser | 99/331 |
| 3,236,998 | A | * | 2/1966 | Wertheimer | A47J 37/0635 219/396 |
| 3,332,559 | A | * | 7/1967 | Loveland | 414/739 |
| 3,677,170 | A | * | 7/1972 | Shelton et al. | 99/337 |
| 4,364,308 | A | * | 12/1982 | John | A47J 37/0611 99/351 |
| 5,606,905 | A | * | 3/1997 | Boehm et al. | 99/375 |
| 6,016,741 | A | * | 1/2000 | Tsai et al. | 99/341 |
| 6,168,051 | B1 | * | 1/2001 | Poppell | 222/209 |
| 6,363,842 | B1 | * | 4/2002 | Lin | 99/425 |
| 6,439,108 | B1 | * | 8/2002 | Wu | 99/349 |
| 6,595,114 | B1 | * | 7/2003 | Endres et al. | 99/342 |
| 7,180,034 | B1 | * | 2/2007 | Oppenheimer | 219/386 |
| 7,872,213 | B2 | * | 1/2011 | De Leon et al. | 219/385 |
| 2005/0005777 | A1 | * | 1/2005 | Steinberg et al. | 99/349 |
| 2006/0086351 | A1 | * | 4/2006 | Wilgus et al. | 126/9 R |
| 2006/0213373 | A1 | * | 9/2006 | Fernandez et al. | 99/349 |
| 2007/0157823 | A1 | * | 7/2007 | Cohen et al. | 99/372 |

(Continued)

*Primary Examiner* — Hung D Nguyen
(74) *Attorney, Agent, or Firm* — Rabin & Berdo, P.C.

(57) ABSTRACT

A grill has an upper and a lower grill unit and a lift lever. The lower of the lift lever is pivot jointed to the lower grill unit. The upper grill unit is pivot jointed to the lift lever. An elastic limit mechanism which has a torsional spring, a fixation piece and a limit rib, is disposed between the lift lever and the upper grill unit. The fixation piece is fixed to the upper grill unit, the limit rib is fixed to the lift lever, the fixation piece is coupled to the limit rib; the two ends of the torsional spring are separately connected to the upper grill unit and the lift lever, the torque of the torsional spring works on the fixation piece and the limit rib to make the two contact and limit.

7 Claims, 5 Drawing Sheets

(56) References Cited

U.S. PATENT DOCUMENTS

| | | | |
|---|---|---|---|
| 2009/0000490 A1* | 1/2009 | Krasznai | 99/376 |
| 2009/0308260 A1* | 12/2009 | Trost | 99/349 |
| 2009/0320695 A1* | 12/2009 | Serra et al. | 99/380 |

* cited by examiner

GRILL

FIELD OF THE INVENTION

The present invention relates to a grill, especially to a grill with the upper grill unit and the lift lever can be situated in the preset position.

BACKGROUND OF THE INVENTION

The existing grill includes an upper grill unit, a lower grill unit and a lift lever. The lower of the lift lever is pivot jointed to the lower grill unit. The upper grill unit is pivot jointed to the lift lever. When the grill is open to be used, the upper grill unit and the lift lever are crossed with an angle. Different angle the lift lever lifts, different the cross angle. The oil of the upper grill unit will not drop to the oil pan directly but to the lower grill unit or outside the lower grill unit to make the grill or the place dirty. The existing grill is used inconvenient, hardly to meet the requirement of the consumer.

SUMMARY OF THE INVENTION

The present invention is provided with a grill, which overcomes the disadvantages of the existing technology.

The technical proposal of the present invention to solve the technical problems is as below:

A grill includes an upper grill unit, a lower grill unit and a lift lever, the lower of said lift lever is pivot jointed to the lower grill unit, said upper grill unit is pivot jointed to said lift lever; an elastic limit mechanism is disposed between said lift lever and said upper grill unit, the elastic limit mechanism includes a torsional spring, a fixation piece and a limit rib; said fixation piece is fixed to said upper grill unit, said limit rib is fixed to the lift lever, said fixation piece is coupled to said limit rib; the two ends of said torsional spring are separately connected to the upper grill unit and the lift lever, the torque of said torsional spring works on the fixation piece and the limit rib to make the two contact and limit.

In another preferred embodiment, a column is disposed in the middle of said lift lever, said upper grill unit is contact with said column, a pivot is connected to said lift lever, the column and the middle part of said upper grill unit; said lift lever is disposed with a pin, said upper grill unit is disposed with a groove, said torsional spring is sleeved with said column, one end of said torsional spring is looped and sleeved to the pin, the other end of said torsional spring is disposed with an inserted end and inserted to the groove.

In another preferred embodiment, said lift lever is parallel to said upper grill unit when said fixation piece is contacted to the limit rib.

In another preferred embodiment, said fixation piece and the limit rib are separately projected over the corresponding surfaces of said upper grill unit and said lift lever, the projection distances of said fixation piece and said limit rib are smaller than the distance of the axis distance of said column.

In another preferred embodiment, an oil box is connected to said lower grill unit, an oil outlet is disposed in said upper grill unit, the oil outlet is disposed above said oil box.

Compared to the existing technology, the present invention has advantages as below: The torque of the torsional spring works and makes the upper grill and the lift lever reset to move toward the preset position; the fixation piece and the limit rib are contacted together to make the upper grill unit and the lift lever move and retain in the preset position. So that the oil of the upper grill unit drops to the oil pan directly. The present invention is clean to meet the requirement of the customs. the fixation piece and the limit rib are separately projected over the corresponding surfaces of the upper grill unit and the lift lever, the projection distances of the fixation piece and the limit rib are smaller than the distance of the axis distance of the column. The structure is simple with accurately limit.

BRIEF DESCRIPTION OF THE DRAWINGS

The present invention will be further described with the drawings and the embodiments.

DETAILED DESCRIPTION OF THE EMBODIMENT

Figure 1:
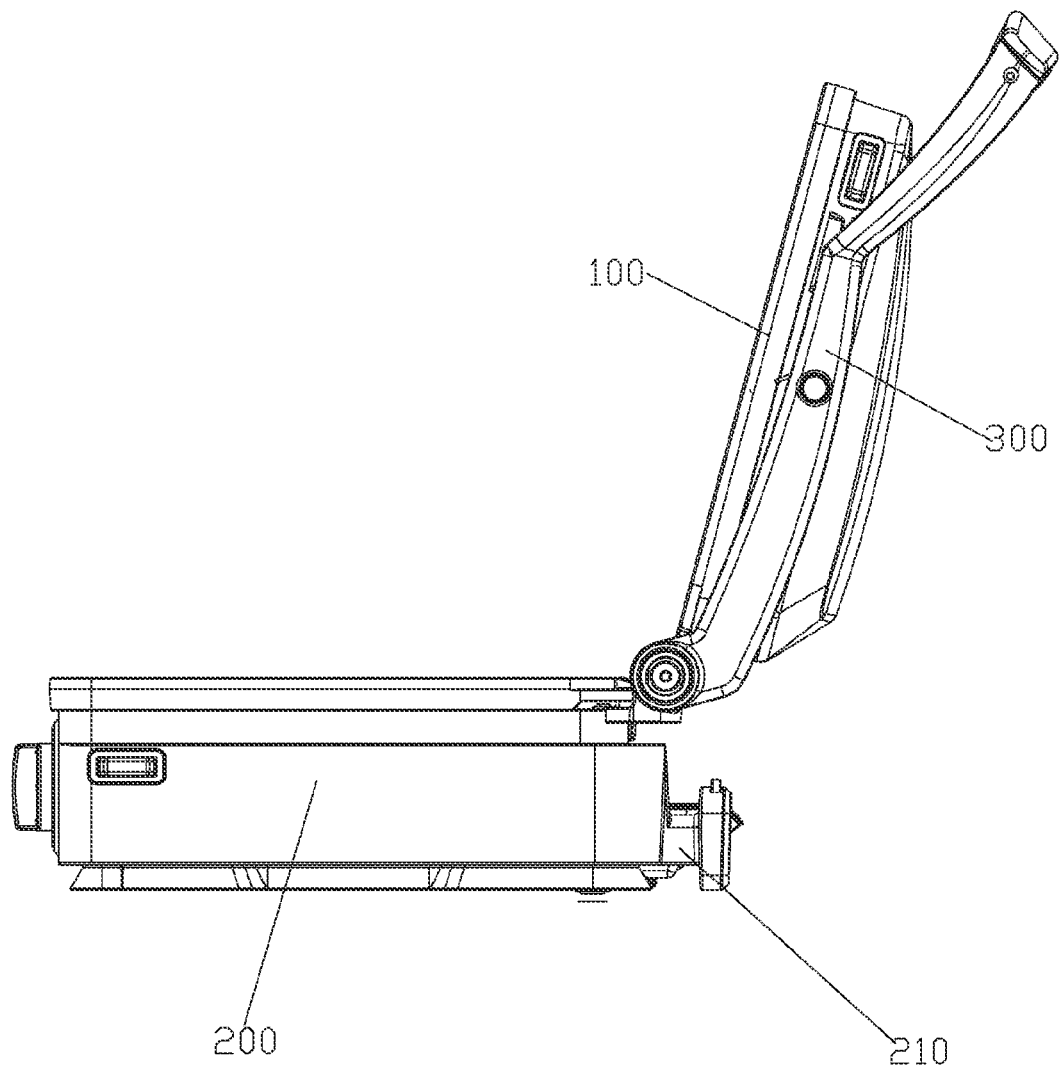
FIG. 1 illustrates the front view of the grill in open state.
Figure 2:
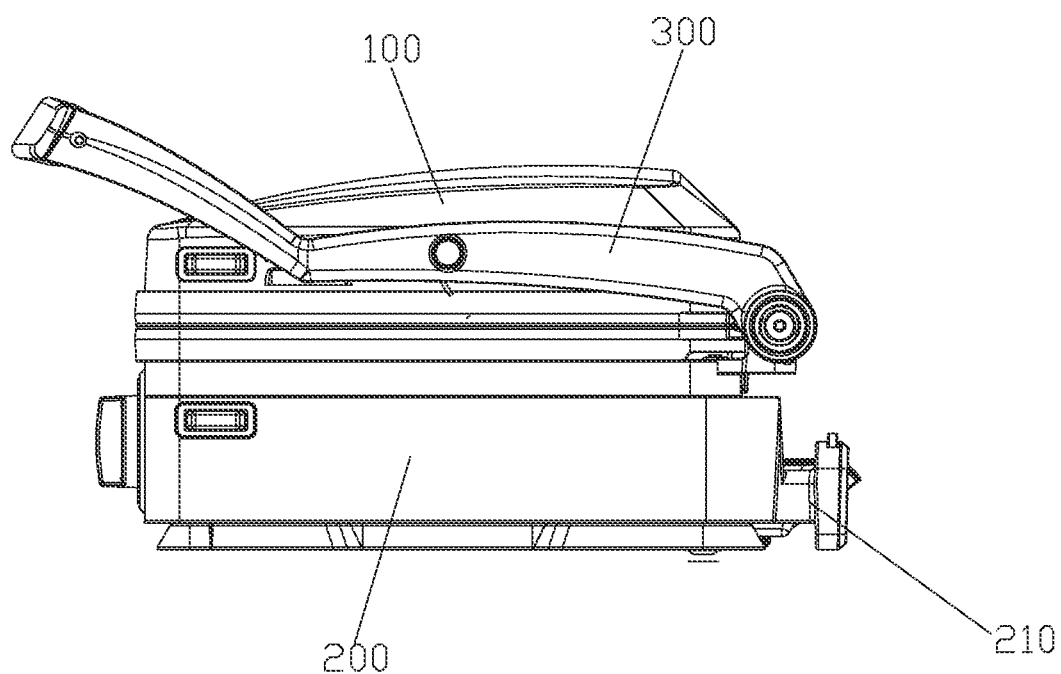
FIG. 2 illustrates the front view of the grill in close state.
Figure 3:
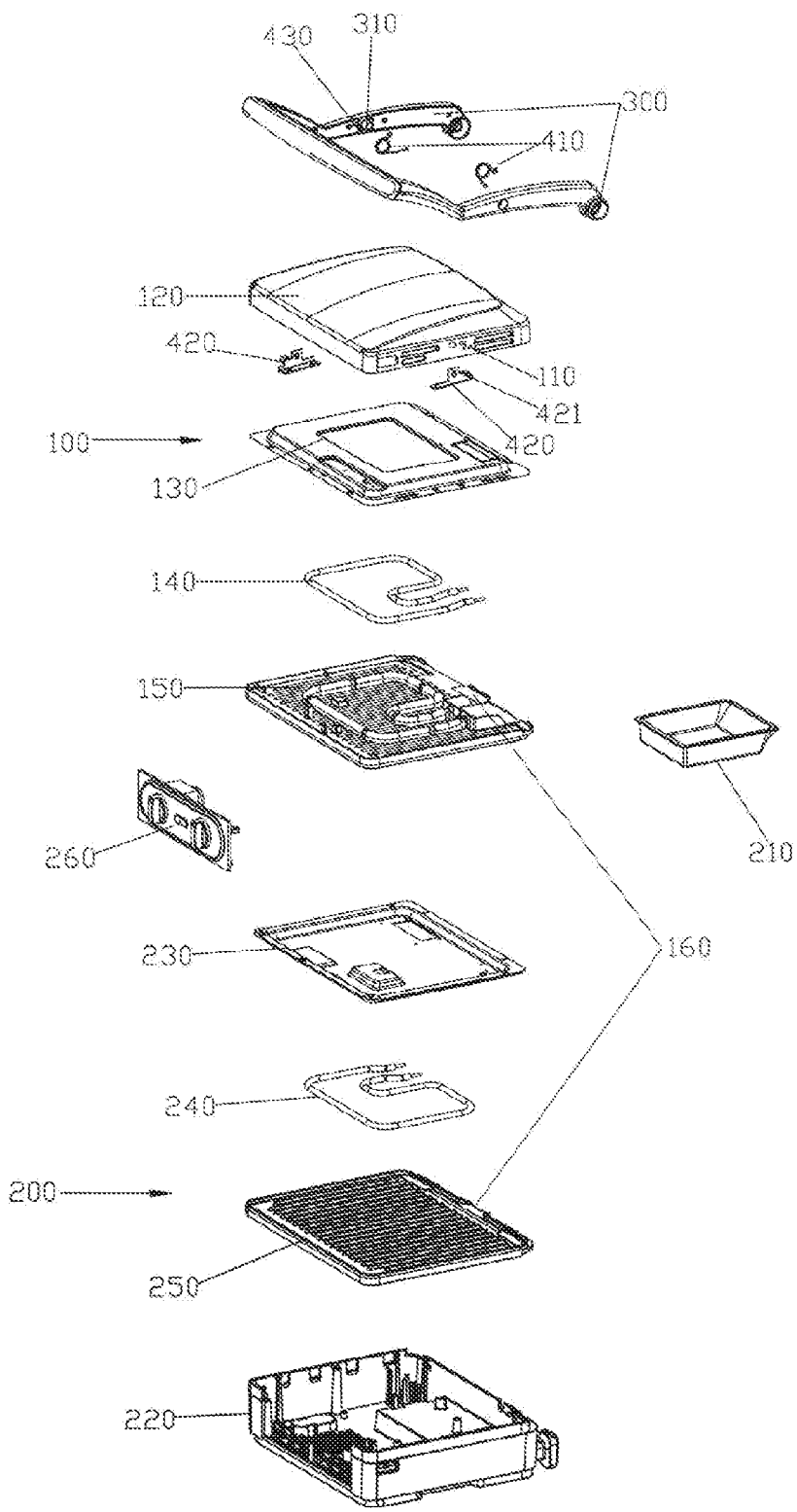
FIG. 3 illustrates the breakdown structure of the grill.
Figure 4:
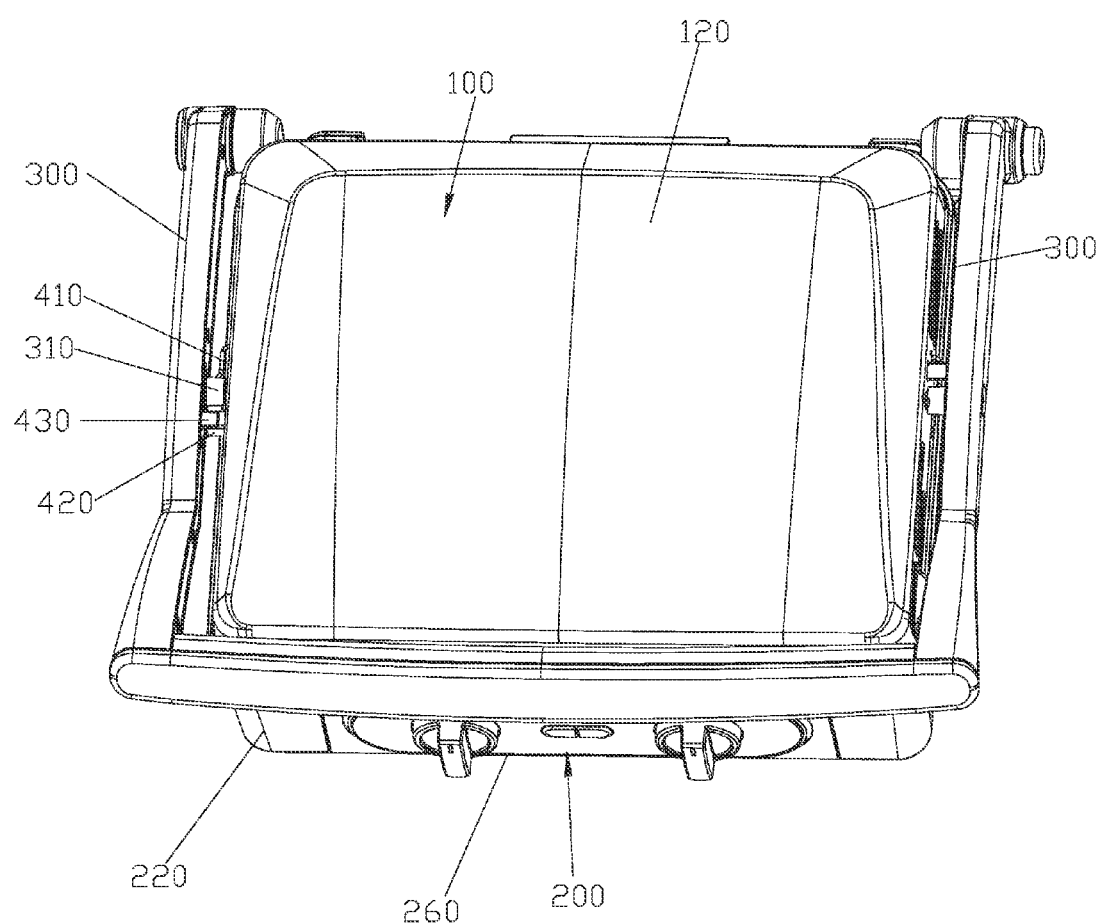
FIG. 4 illustrates the structure of the grill.
Figure 5:
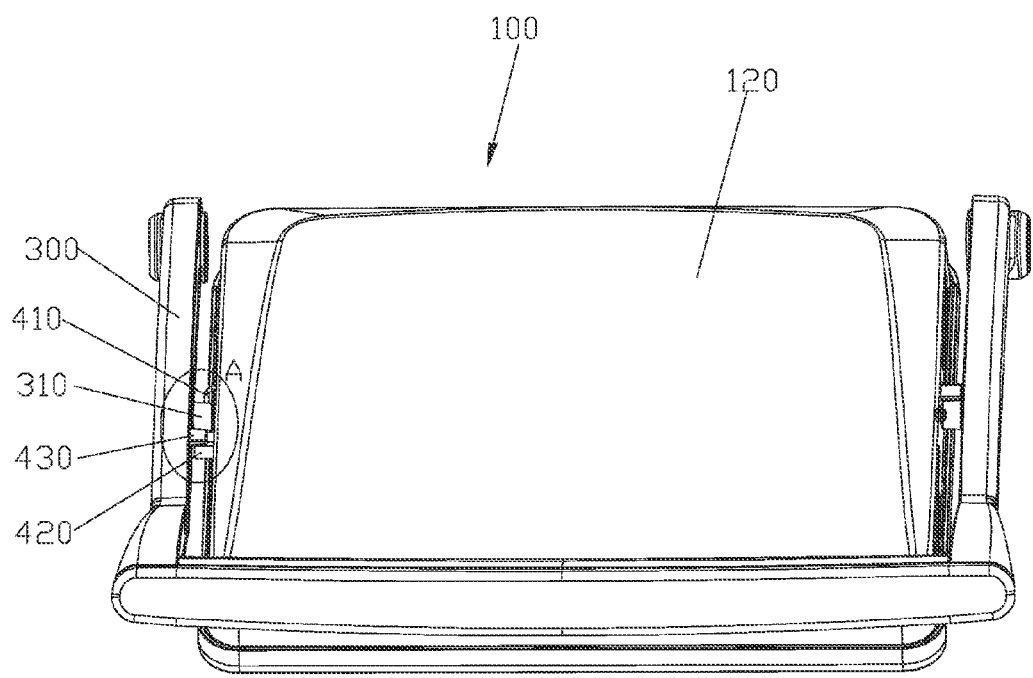
FIG. 5 illustrates the assembly of the upper grill unit and the lift lever.
Figure 6:
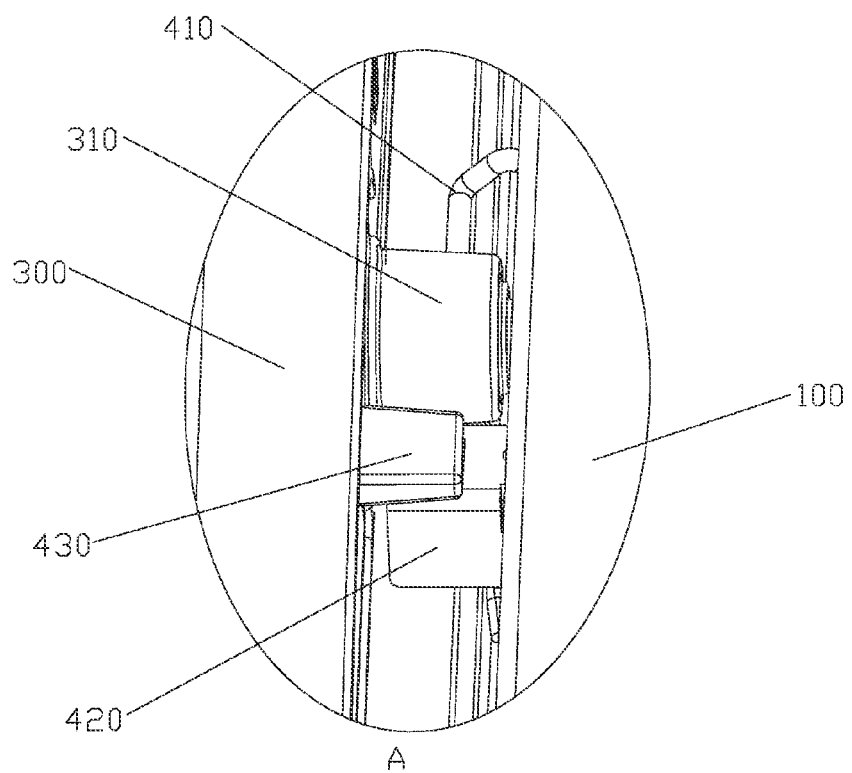
FIG. 6 illustrates the enlarge view of the A part of the FIG. 5.

Refer to the FIG. 1, FIG. 2, FIG. 3, FIG. 4, FIG. 5 and FIG. 6 of a grill, which includes an upper grill unit 100, a lower grill unit 200 and two lift levers 300. The lowers of the two lift lever 300 are pivot jointed to the lower grill unit 200. The upper grill unit 100 is pivot jointed in the middle of the two lift levers 300. In this embodiment, a column 310 is fixed in the middle of the lift lever 300. the upper grill unit 100 is contacted to the column. A pivot is connected to the lift lever 300, the column 310 and the middle part of the upper grill unit 100, making the upper grill unit 100 and the lift lever 300 to form a pivot joint relationship and the column 310 situated between the lift lever 300 and the upper grill unit 100. In this embodiment, the upper ends of the two lift levers 300 are fixed together by a bar.

In this embodiment, the upper grill unit 100 includes an upper housing 120 and an upper reflection board 130, an upper heating element 140 and an upper baking pan 150 cased in the upper housing 120. the lower grill unit 200 includes a lower housing 220 and a lower reflection board 230, a lower heating element 240, a lower baking pan 250 and a control board 260 cased in the lower housing 220.

An elastic limit mechanism is disposed between the lift lever 300 and the upper grill unit 100. The elastic limit mechanism includes a torsional spring 410, a fixation piece 420 and a limit rib 430.

The fixation piece 420 is fixed to the upper grill unit 100. In this embodiment, the fixation piece 420 includes an L-shaped piece and a projecting L-shaped piece coupled and fixed to the upper grill unit 100 and a position piece 421 of the upper grill unit 100. The limit rib 430 is fixed and projecting over the lift lever 310. The projection distance of the position piece 421 of the fixation piece 420 and the limit rib 430 are smaller than the axis distance of the column 310, which is the clearance between the lift lever and the upper grill unit. The fixation piece 420 is coupled to the limit rib 430. the lift lever 300 is disposed with a pin, the upper grill unit 100 is disposed with a groove 110. the torsional spring 410 is sleeved with the column, and one end of the torsional spring 410 is looped and sleeved with the pin, while the other end is disposed with an inserted end and inserted to the groove 110, making the two ends of the torsional spring 410 separately connected to the upper grill unit 100 and the lift lever 300. The torque of the torsional spring works on the fixation piece 420 and the limit rib 430 to make the two contact and limit. The lift lever 300 is parallel to the upper grill unit 100 when the position piece 421 of the fixation piece 420 is contacted to the limit rib 430. Preferred, the lower grill unit 200 is disposed with an oil box 210; the upper grill unit 100 is disposed with an oil outlet 160, the oil outlet 160 is situated above the oil box 210.

The user lifts the lift lever 300, making the upper grill unit 100 rotate relatively to the lower grill unit 200. The lift lever 300 and the upper grill unit 100 rotate relatively from the preset position, making the torsional spring deform to generate torque. The torque makes the upper grill and the lift lever reset to move relatively to the preset position; the relative preset position is the position to keep the upper grill unit and the lift lever parallel to each other, for example, or it can be the position that the oil of the upper grill unit can exactly drop to the oil pan. the fixation piece and the limit rib are contacted together to make the upper grill unit and the lift lever move and retain in the preset position. So that the oil of the upper grill unit drops to the oil pan.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims and application.

What is claimed is:

1. A grill: comprising an upper grill unit, a lower grill unit and a lift lever,
    wherein a lower end of said lift lever pivot jointed to the lower grill unit, and said upper grill unit pivot jointed to said lift lever;
    an elastic limit mechanism is disposed between said lift lever and said upper grill unit, the elastic limit mechanism including a torsional spring, a fixation piece and a limit rib;
    said fixation piece is fixedly mounted on said upper grill unit, said limit rib is fixedly mounted on the lift lever, and said fixation piece is coupled to said limit rib;
    first and second ends of said torsional spring are separately connected to the upper grill unit and the lift lever, and the torque of said torsional spring works on the fixation piece and the limit rib to make the fixation piece and the limit rib contact and limit;
    wherein a column is disposed in a middle of said lift lever, and said upper grill unit is in contact with said column, such that each of said lift lever, the column and a middle part of said upper grill unit are pivotally connected to each other;
    said upper grill unit is provided with a groove, said torsional spring is sleeved with said column, one end of said torsional spring is provided with an inserted end and inserted into the groove.

2. The grill according to claim 1, wherein said lift lever is parallel to said upper grill unit when said fixation piece contacts the limit rib.

3. The grill according to claim 2, wherein:
    an oil box is connected to said lower grill unit,
    an oil outlet is disposed in said upper grill unit, and
    the oil outlet is disposed above said oil box.

4. The grill according to claim 1, wherein:
    an oil box is connected to said lower grill unit,
    an oil outlet is disposed in said upper grill unit, and
    the oil outlet is disposed above said oil box.

5. A grill: comprising an upper grill unit, a lower grill unit and a lift lever,
    wherein a lower end of said lift lever pivot jointed to the lower grill unit, and said upper grill unit pivot jointed to said lift lever;
    an elastic limit mechanism is disposed between said lift lever and said upper grill unit, the elastic limit mechanism including a torsional spring, a fixation piece and a limit rib;
    said fixation piece is fixedly mounted on said upper grill unit, said limit rib is fixedly mounted on the lift lever, and said fixation piece is coupled to said limit rib;
    first and second ends of said torsional spring are separately connected to the upper grill unit and the lift lever, and the torque of said torsional spring works on the fixation piece and the limit rib to make the fixation piece and the limit rib contact and limit, wherein:
    a column is disposed in a middle of said lift lever, and said upper grill unit is in contact with said column, such that each of said lift lever, the column and a middle part of said upper grill unit are pivotally connected to each other;
    said upper grill unit is provided with a groove, said torsional spring is sleeved with said column, one end of said torsional spring is provided with an inserted end and inserted into the groove,
    said fixation piece and the limit rib separately project over the corresponding surfaces of said upper grill unit and said lift lever, and
    the projection distances of said fixation piece and said limit rib are smaller than the distance of the axis distance of said column.

6. The grill according to claim 5, wherein:
    an oil box is connected to said lower grill unit,
    an oil outlet is disposed in said upper grill unit, and
    the oil outlet is disposed above said oil box.

7. A grill: comprising an upper grill unit, a lower grill unit and a lift lever,
    wherein a lower end of said lift lever pivot jointed to the lower grill unit, and said upper grill unit pivot jointed to said lift lever;
    an elastic limit mechanism is disposed between said lift lever and said upper grill unit, the elastic limit mechanism including a torsional spring, a fixation piece and a limit rib;
    said fixation piece is fixedly mounted on said upper grill unit, said limit rib is fixedly mounted on the lift lever, and said fixation piece is coupled to said limit rib;
    first and second ends of said torsional spring are separately connected to the upper grill unit and the lift lever, and the torque of said torsional spring works on the fixation piece and the limit rib to make the fixation piece and the limit rib contact and limit, wherein:
    a column is disposed in a middle of said lift lever, and said upper grill unit is in contact with said column, such that each of said lift lever, the column and a middle part of said upper grill unit are pivotally connected to each other;
    said upper grill unit is provided with a groove, said torsional spring is sleeved with said column, one end of said torsional spring is provided with an inserted end and inserted into the groove,
    an oil box is connected to said lower grill unit,
    an oil outlet is disposed in said upper grill unit, and
    the oil outlet is disposed above said oil box.

* * * * *